UNITED STATES PATENT OFFICE.

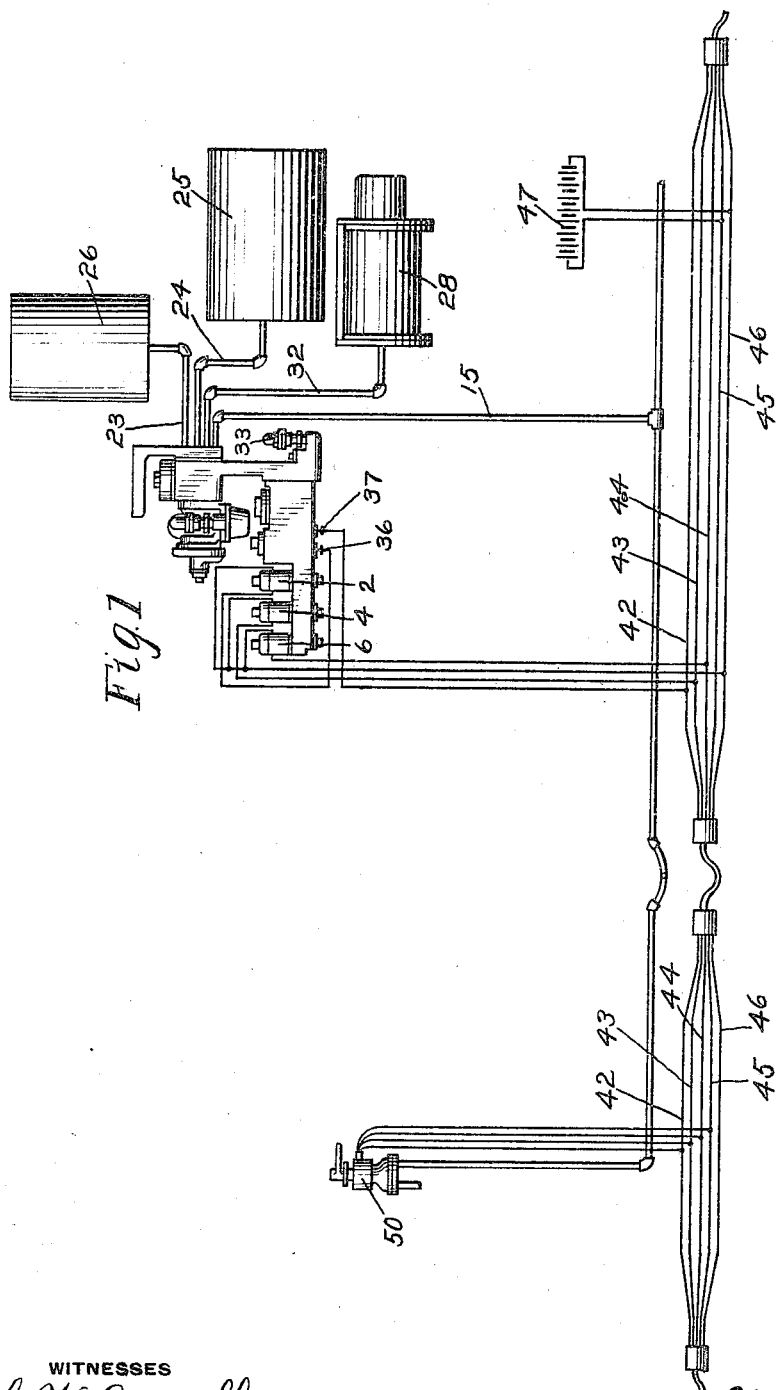

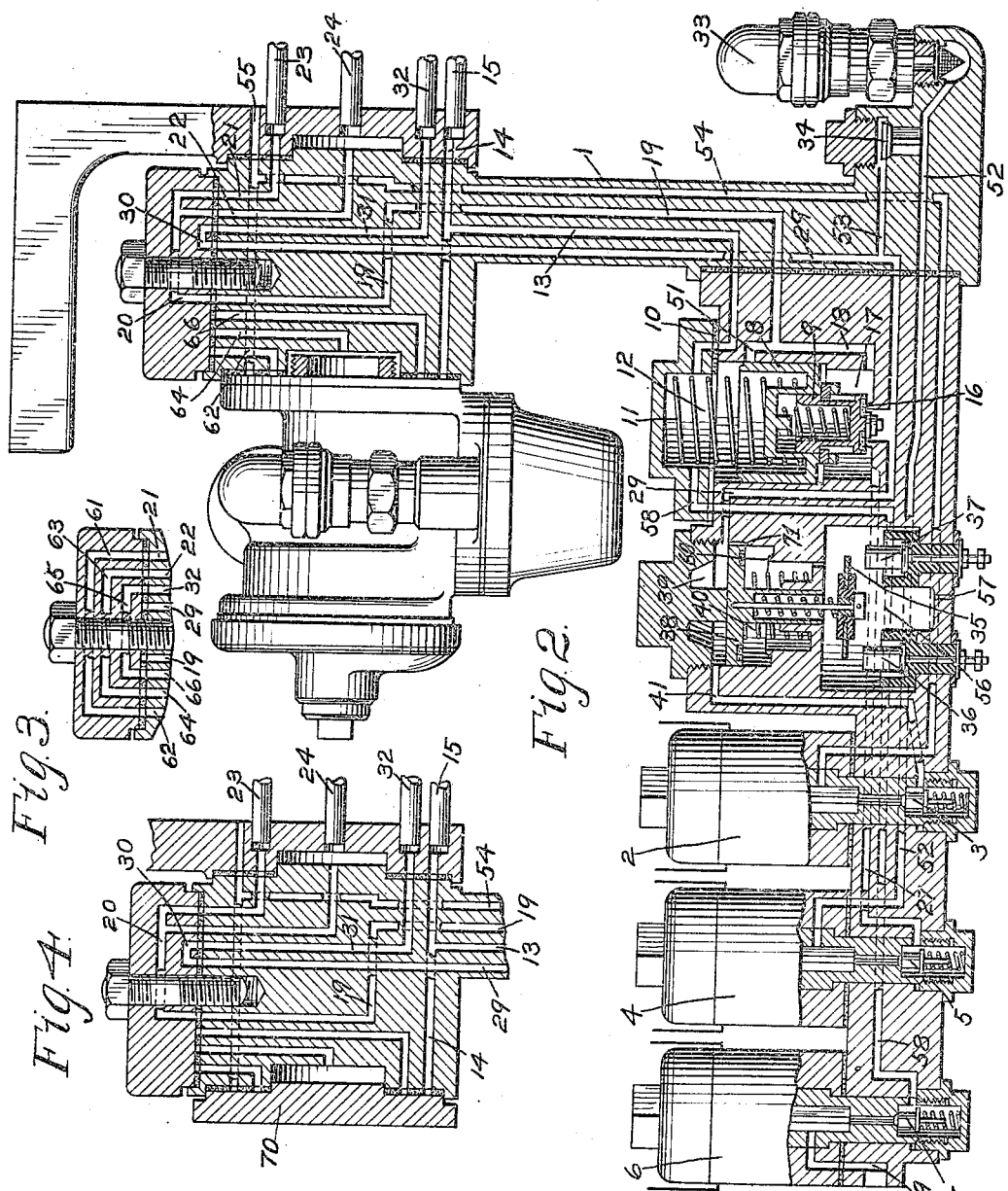

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

ELECTROPNEUMATIC BRAKE.

1,256,616.  Specification of Letters Patent.  Patented Feb. 19, 1918.

Application filed July 27, 1915. Serial No. 42,128.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to fluid pressure brakes, and more particularly to a brake equipment adapted to be controlled electrically.

The principal object of the invention is to provide an electro-pneumatic brake equipment adapted to be operated separately from the usual pneumatic equipment, while means are provided for separately operating the pneumatic equipment with the electric portion cut out.

Other objects and advantages will appear in the following more detailed description of the invention.

In the accompanying drawings; Figure 1 is a diagrammatic view of a car brake equipment embodying my invention; Fig. 2 a central sectional view of the improved electro-pneumatic brake controlling valve mechanism shown interposed between the usual pipe bracket and a standard triple valve device; Fig. 3 a detail sectional view of the cut out cap in a position to cut out the electric features and cut in the triple valve; and Fig. 4 a detail sectional view showing the cut out cap in position for electric operation and a blanking flange applied in place of the triple valve.

As shown in Fig. 2 of the drawings, the electro-pneumatic brake controlling valve mechanism 1 may comprise a release magnet 2 for operating a release valve 3, a service magnet 4 for operating a service application valve 5, and an emergency magnet 6 for operating an emergency application valve 7.

In order to insure an application of the brakes in case the electric portion becomes inoperative, or in case of a burst hose, or a break-in-two, there is provided an emergency valve device comprising a piston 8 and a valve 9 adapted to be operated thereby, said piston having a movement relative to the valve 9 for opening and closing a port 51. The piston 8 is adapted to seal against a seat 10 in one position, and the valve 9 against a seat 16, and when seated, only a restricted area of valve 9 is subject to brake cylinder pressure supplied through pipe 32, passage 31, cavity 30, and passage 29. Said piston is subject on one side to the pressure of a coil spring 11 and that in chamber 12, open at all times through passages 13 and 14, to the brake pipe 15, and through passage 58 to emergency magnet valve 7. The opposite side of piston 8 is exposed to the pressure in chamber 17 which is connected to the auxiliary reservoir 25 through passages 18, 19, cavity 20, passage 22 and pipe 24, a branch of cavity 20 connecting with passage 21 which leads through pipe 23 to the supplemental reservoir 26. Chamber 17 also communicates with the service application magnet valve 5 through passage 27.

In order that the brake cylinder pressure may be limited to a predetermined degree in electric service applications, a safety valve 33 of the usual construction may be connected to the service magnet supply passage 52.

In order to save current, according to one feature of my invention, the release magnet can only be energized when there is pressure in the brake cylinder, and for this purpose there is provided a switch 35 adapted to be operated by a piston 38 subject on one side to the pressure in chamber 39 which is in communication with the brake cylinder through passage 29, cavity 30, passage 31 and pipe 32, and with the release magnet valve 3 through passage 41, the opposite side of said piston being subject to the pressure of a spring 40.

As illustrated in Fig. 1 of the drawings, five train wires are employed, a release wire 42 leading to one terminal of the release magnet on each car, an electric service application wire 43 leading to one terminal of the service application magnet 4, an emergency application wire 44 connecting to the emergency application magnet 6, and a supply wire 45 and return wire 46 having a source of current 47 connected across same on each car of the train or on one car only, the other terminals of the magnets being connected to the common return wire 46.

In operation, by manipulation of the brake valve 50, which may be of the usual standard type with the addition of the necessary stationary and movable electric contacts, fluid is supplied to the train pipe 15 and thence flows through passages 14 and 13 to chambers 12, as shown in Fig. 2. Piston 8 is then moved downwardly a slight amount to open port 51, so that fluid can flow through passage 19 to cavity 20 and thence through passage 22 and pipe 24 to the auxiliary reservoir 25 and through passage 21 and pipe 23 to the supplemental reservoir 26, thus charging these reservoirs to brake pipe pressure. Chamber 17 is also charged to brake pipe pressure by fluid supplied through passage 18. When the reservoirs have been charged to substantially the same pressure as in the brake pipe, piston 8 will move upward, again closing port 51.

When it is desired to operate the brakes electrically, the cut out cap is turned to the position shown in Fig. 2 of the drawings, thereby establishing the proper port connections to render the electric features operative and the triple valve inoperative. If the brake valve is now turned to service application position, current is supplied to the service application magnet 4, energizing the same to open valve 5. Fluid then flows from the auxiliary reservoir through pipe 24 and passage 22, and from the supplemental reservoir 26 through pipe 23 and passage 21 to cavity 20, and thence through passage 19, chamber 17, passage 27, past valve 5 through passage 52, past check valve 34, through passages 53, 29, cavity 30, passage 31 and pipe 32, to the brake cylinder. Fluid also flows to chamber 39, and piston 38 is thereby moved downwardly to its seat 60, closing the switch 35. When the brake cylinder pressure has been built up to the maximum service pressure, according to the adjustment of the safety valve 33, any further increase in brake cylinder pressure is prevented by the operation of the safety valve in the usual manner.

To release the brakes, the brake valve is turned to release position in which the release magnet is energized and its valve 3 opened. Fluid will then exhaust from the brake cylinder through pipe 32, passage 31, cavity 30, passage 29, chamber 39, passage 41, past valve 3 and through passages 54 and 55 to the atmosphere.

If it is desired to release the brakes, the brake valve handle is turned to release position, and the release magnet 2 is energized to open the release valve 3 and permit the escape of fluid from the brake cylinder, since the switch 35 is now closed. When, however, the brake cylinder pressure has been reduced to a low degree by exhausting at the release valve 3, the force exerted by spring 40 will exceed the force of the air pressure acting in chamber 39 against piston 38 and consequently said piston will be returned to its uppermost position, thereby moving switch 35 away from contacts 36 and 37 and opening the release magnet circuit. The release magnet 2 will therefore be deënergized and its valve 3 will be returned to its seat. Whatever pressure remains in the brake cylinder can now escape to the atmosphere through groove 71 around piston 38 to chamber 56 and exhaust port 57.

In order to effect an electric emergency application of the brakes, the brake valve is moved to emergency position in which the usual circuit connections are made to energize the emergency application magnet 6 and open valve 7. This establishes communication from passage 58 to passage 59 so that fluid is vented from chamber 12 to the atmosphere. Piston 8 will then move upward against seat 10 and valve 9 will be lifted from its seat 16 communication being thereby established from chamber 17 to passage 29, so that fluid flows from the supplemental reservoir 26 and the auxiliary reservoir 25, through passage 19, chamber 17, passages 29, cavity 30, passage 31 and pipe 32 to the brake cylinder, switch 35 being closed the same as during a service application.

In order to obtain a higher maximum pressure in emergency than in service, both the auxiliary and supplemental reservoirs are connected to equalize into the brake cylinder in emergency applications, and for this purpose these two reservoirs are connected together when the cut out cap is in a position to render the electric features operative.

It will be noted that in an emergency application of the brakes, fluid flows directly to the brake cylinder through passage 29, so that the check valve 34 prevents flow to the safety valve 33. The full maximum pressure due to equalization of the auxiliary reservoir and the supplemental reservoir into the brake cylinder can thus be obtained in an emergency application of the brakes, while in a service application, as hereinbefore described, the pressure is limited by the action of the safety valve.

When a release is made after an emergency application and the brake valve returned to release position, the emergency magnet 6 is deënergized and its valve 7 closed. The pressure in the brake pipe will be restored in the usual manner and when the pressures on piston 8 are balanced it will be shifted from its seat 10 and valve 9 will be moved to its seat 16, thus closing communication from the reservoirs to the brake cylinder. Passage 51 will be again opened and the auxiliary and supplemental reservoirs recharged in the manner previously described.

Co-incidentally with the deënergizing of the emergency application magnet 6, the release magnet 2 is energized and its valve 3 opened. Fluid will then exhaust from the brake cylinder and switch 35 will be opened in the same manner as during a release after a service application.

If the electrical features of the above described apparatus become inoperative by loss of current, break down, or otherwise, the brakes may at any time be pneumatically operated by a movement of the brake valve handle to emergency position in which the brake pipe is open to the atmosphere, and a rapid venting of air is thereby made. This causes a sudden drop of pressure in chamber 12 and will result in the operation of piston 8 and valve 9 in the same manner as in electric emergency, the only difference being that the action will be serial throughout the train instead of simultaneous.

In case of a burst hose or a parted train, the resulting drop in brake pipe pressure will actuate the emergency valve mechanism and a pneumatic emergency application will be obtained.

If it is desired to operate the brakes pneumatically, as for example, during the transition period when all cars in a train are not equipped with the electric features, the cut out cap is turned to the position shown in Fig. 3 of the drawings. Passage 61 then connects passage 21 with passage 62, passage 63 connects passage 22 with passage 64, and passage 65 connects passage 32 with passage 66. In this manner the auxiliary and supplemental reservoirs and the brake cylinder are connected to the triple valve, and pneumatic operation of the brakes may now be obtained just as if the electrical parts were not on the car.

When all the cars are equipped with the electrical features the triple valve may be dispensed with and a blanking flange 70 applied to the triple valve face of the electrical portion, as shown in Fig. 4 of the drawings.

Having now described my invention what I claim as new and desire to secure by Letters Patent, is:

1. The combination with a device responsive to variations in fluid pressure for controlling the brakes and an electro-responsive device for also controlling the brakes, of means for rendering either device unresponsive while the other device is responsive.

2. The combination with a brake pipe, a valve device operated upon a reduction in brake pipe pressure for effecting an application of the brakes, and a valve mechanism for effecting an application of the brakes electrically, of a cap device having one position for cutting the valve device out of action while the electrically controlled valve mechanism is cut in and another position in which the electrically controlled valve mechanism is cut out and the pneumatically controlled valve device cut in.

3. The combination with a brake pipe, a valve device operated upon a reduction in brake pipe pressure for effecting an application of the brakes, and a valve mechanism operated electrically for also effecting an application of the brakes, of means for cutting said valve device out of action when said valve mechanism is cut in and valve means operated upon a sudden reduction in brake pipe pressure for effecting an application of the brakes when said valve device is cut out.

4. The combination with a brake pipe, reservoir, and brake cylinder, of a valve device operated by brake pipe pressure for opening communication for supplying fluid from the brake pipe to said reservoir and adapted upon a sudden reduction to supply fluid from the reservoir to the brake cylinder, means operated electrically for also effecting the operation of said valve device, and a triple valve device operated upon a reduction in brake pipe pressure for effecting an application of the brakes when said electrically controlled means is cut out of action.

5. In an electro-pneumatic brake, the combination with a brake cylinder, a valve for controlling the release of fluid from the brake cylinder, and a magnet for opening said valve upon energization, of a switch device normally opening the magnet circuit and operated by brake cylinder pressure for closing said circuit.

6. In an electro-pneumatic brake, the combination with a brake cylinder, a valve for controlling the release of fluid from the brake cylinder, and a magnet for opening said valve upon energization, of a switch device normally opening the magnet circuit and operated by brake cylinder pressure for closing said circuit, and adapted to open the circuit when the brake cylinder pressure has been reduced to a predetermined degree, said switch device having means for permitting the exhaust of fluid remaining in the brake cylinder when the switch is opened.

7. In an electro-pneumatic brake, the combination with a brake cylinder and a release magnet and valve for controlling the release of fluid from the brake cylinder, of a switch for controlling the circuit of the release magnet and a piston operated by brake cylinder pressure for closing said switch and adapted to open the switch when the brake cylinder pressure has reduced to a low degree and having a port for venting the fluid remaining in the brake cylinder in the open position of said piston.

In testimony whereof I have hereunto set my hand.

WALTER V. TURNER.

Witnesses:
A. M. CLEMENTS,
S. W. KEEFER.